United States Patent
Biskup (10) Patent No.: US 9,514,086 B2
(45) Date of Patent: Dec. 6, 2016

(54) CONFIGURATION SWITCH FOR A BROADCAST BUS

(71) Applicant: Atieva, Inc., Redwood City, CA (US)

(72) Inventor: Richard J. Biskup, Redwood City, CA (US)

(73) Assignee: Atieva, Inc., Menlo Park, CA (US)

( * ) Notice: Subject to any disclaimer, the term of this patent is extended or adjusted under 35 U.S.C. 154(b) by 360 days.

(21) Appl. No.: 13/801,913

(22) Filed: Mar. 13, 2013

(65) Prior Publication Data

US 2014/0281078 A1 Sep. 18, 2014

(51) Int. Cl.
- *G06F 3/00* (2006.01)
- *G06F 13/00* (2006.01)
- *G06F 13/42* (2006.01)

(52) U.S. Cl.
CPC ........... *G06F 13/4282* (2013.01); *G06F 3/00* (2013.01); *G06F 13/00* (2013.01)

(58) Field of Classification Search
USPC ............ 710/8–10, 104, 110, 305, 316, 317
See application file for complete search history.

(56) References Cited

U.S. PATENT DOCUMENTS

| | | | |
|---|---|---|---|
| 4,456,965 A | 6/1984 | Graber et al. | |
| 6,363,066 B1* | 3/2002 | Frimodig | 370/360 |
| 6,421,710 B1* | 7/2002 | Jasperneite et al. | 709/208 |
| 6,661,683 B2* | 12/2003 | Botker et al. | 363/60 |
| 6,944,695 B1 | 9/2005 | Tangen | |
| 7,649,383 B2 | 1/2010 | Kobayashi et al. | |
| 7,746,114 B2* | 6/2010 | Nagase | 326/82 |
| 7,893,717 B1 | 2/2011 | Meany et al. | |
| 8,231,996 B2 | 7/2012 | Howard et al. | |
| 8,354,186 B2 | 1/2013 | Muis | |
| 8,487,689 B2 | 7/2013 | Floyd | |
| 8,586,230 B2 | 11/2013 | Kim et al. | |
| 8,719,477 B2 | 5/2014 | Kaneko | |
| 8,868,807 B2 | 10/2014 | Kashima | |
| 2004/0225814 A1 | 11/2004 | Ervin | |
| 2005/0251608 A1* | 11/2005 | Fehr et al. | 710/309 |
| 2006/0242350 A1* | 10/2006 | Worley | 710/305 |

(Continued)

FOREIGN PATENT DOCUMENTS

| | | |
|---|---|---|
| KR | 1020010062420 | 7/2001 |
| KR | 1020120055241 | 5/2012 |
| WO | WO 0139515 | 5/2001 |

OTHER PUBLICATIONS

The MOSSFET as a switch, <http://www.electronics-tutorials.ws/transistor/tran_7.html>, accessed Jan. 20, 2015.*

(Continued)

*Primary Examiner* — Khanh Dang
(74) *Attorney, Agent, or Firm* — Womble Carlyle Sandridge & Rice LLP (57) ABSTRACT

A bidirectional bus system is provided. The bidirectional bus system includes a plurality of bus slaves configured to couple to a bidirectional bus. Each bus slave of the plurality of bus slaves has a switch operated by a switch control to selectably couple and decouple an upstream portion and a downstream portion of the bidirectional bus relative to the bus slave, with the switch control being powered by activity on the bidirectional bus. A method of operating a bus is also provided.

19 Claims, 5 Drawing Sheets

(56) References Cited

U.S. PATENT DOCUMENTS

| | | | |
|---|---|---|---|
| 2008/0195783 A1 | 8/2008 | Deshpande | |
| 2008/0270654 A1 | 10/2008 | Reberga | |
| 2009/0147673 A1* | 6/2009 | Niigata | 370/225 |
| 2011/0125945 A1* | 5/2011 | Link et al. | 710/110 |
| 2012/0275527 A1 | 11/2012 | Douglass | |
| 2012/0287688 A1 | 11/2012 | Fornage et al. | |
| 2012/0324296 A1* | 12/2012 | Hoffknecht et al. | 714/48 |
| 2013/0052514 A1 | 2/2013 | Kim | |
| 2013/0124763 A1* | 5/2013 | Kessler | 710/110 |
| 2013/0282941 A1* | 10/2013 | Van Dijk | 710/110 |
| 2014/0025999 A1* | 1/2014 | Kessler | 714/43 |

OTHER PUBLICATIONS

P-channel Power MOSFETs Approach N-channel Performance, IXYS Corp, May 2009.*
Definition of Opto-Isolator, <http://en.wikipedia.org/wiki/Opto-isolator>, accessed Jan. 20, 2015.*
Optocoupler Tutorial, <http://www.electronics-tutorials.ws/blog/optocoupler.html>, accessed Jan. 27, 2015.*
International Search Report, PCT/US2014/025560, mailed Jun. 26, 2014.
International Search Report, PCT/US2014/025515, mailed Jul. 8, 2014.
International Search Report, PCT/US2014/024861, mailed Sep. 18, 2014.
International Search Report, PCT/US2014/022807, mailed Jul. 3, 2014.

* cited by examiner

CONFIGURATION SWITCH FOR A BROADCAST BUS

BACKGROUND

Communication buses are many and varied, as exemplified in computer backplanes, board buses, buses inside integrated circuits, bus standards, local area networks, wide area networks, and ad hoc and proprietary buses connecting devices. One bus in widespread use is the CAN (controller area network) bus, originally developed for vehicles. The CAN bus is a multi-master broadcast serial bus, which may be implemented using balanced pair signals in twisted-pair wires, optionally in shielded cables. Other buses may employ differential line drivers and differential receivers. Many buses support two states, "1" and "0", or three states, "1", "0" and "Z" or high impedance. Yet, components for many of these buses may be more expensive than desired, have complex protocols, or may not function well in harsh environments such as automotive. There is a need in the art for a solution which overcomes the drawbacks described above, and/or has features suited for a specific environment.

SUMMARY

A bidirectional bus system and related method are disclosed.

In one embodiment, a bidirectional bus system is provided. The bidirectional bus system includes a plurality of bus slaves configured to couple to a bidirectional bus. Each bus slave of the plurality of bus slaves has a switch operated by a switch control to selectably couple and decouple an upstream portion and a downstream portion of the bidirectional bus relative to the bus slave, with the switch control being powered by activity on the bidirectional bus.

In another embodiment, a bidirectional bus system is provided. The bidirectional bus system includes a plurality of bus slaves configured to couple to a bidirectional bus. Each bus slave of the plurality of bus slaves includes a switch configured to couple and decouple an upstream portion of a first wire and a downstream portion of the first wire of a bidirectional bus, a switch control coupled to the switch, and a charge pump configured to couple to the bidirectional bus and to provide electrical power to the switch control.

In another embodiment, a method of operating a bidirectional bus is provided. The method initiates with opening a plurality of switches successively positioned along a bidirectional bus, to decouple segments of the bidirectional bus from each other. The method includes sending an identifier to an initial segment of the bidirectional bus and accepting the identifier at an upstream segment of the bidirectional bus, the upstream segment being in communication with the initial segment of the bidirectional bus. The method includes coupling a downstream segment of the bidirectional bus to the upstream segment of the bidirectional bus with one of the plurality of switches in response to accepting the identifier and iteratively repeating the sending, the accepting and the coupling, with a unique identifier for each iteration until each switch of the plurality of switches is closed.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

As shown in FIGS. 1-7, embodiments of the dual voltage communication bus have a two wire bus that is bidirectional, and various components that transmit and receive differential voltages on the bus. Twisted pairs, shielded pairs, shielded twisted pairs etc. can be used in the wiring of the bus. The bus can be used to connect a master and one or more slaves. This application is related to U.S. application Ser. Nos. 13/794,535, 13/801,894, and 13/801,936, each of which is incorporated herein by reference for all purposes.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
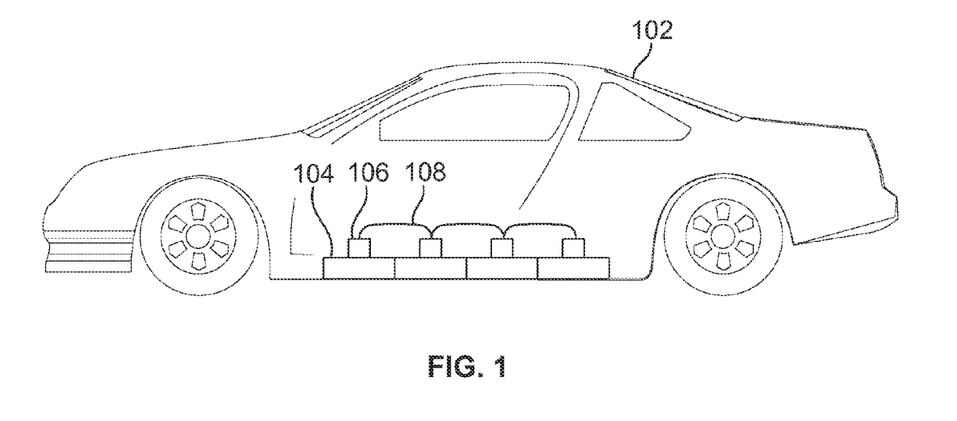
FIG. 1 is a schematic diagram of a communication bus connecting sensors on battery modules in an automobile in accordance with some embodiments.

FIG. 1 shows rechargeable battery application for a communication bus system in accordance with some embodiments. An automobile 102, which could be a hybrid or an electric car, has battery modules 104. On top of the battery modules 104, there are sensor modules 106, which monitor battery conditions, such as temperature and voltage. A communication bus 108 connects the sensor modules 106. The sensor modules 106 can track battery charging, discharging, lifespan, faults or other error or environmental conditions, and communicate these amongst themselves. Low-cost and operation under a variety of conditions, such as temperature, humidity, vibration, acceleration, deceleration, aging, etc., are desirable. The battery modules 104 may be connected in various parallel and serial arrangements, and have differing operating voltages, e.g., successively stacked serial modules with voltages up to 400 volts or more. Over time, components and connectors can age, a wire can break, component values and drive strengths can change, battery cells can go open circuit or short-circuit, and other fault conditions can arise. Signal noise can arise on the communication bus 108 from electromagnetic coupling of the bus to the wiring connecting the battery cells and the large surge currents of up to hundreds of amps in this wiring. Other industrial, commercial and consumer applications may have related or additional concerns and conditions, which a well-designed communication bus system may address. It should be appreciated that while automobile 102 is illustrated in this example, this is not meant to be limiting as any land, sea, or air based vehicle may integrate the bus design described herein.

Figure 2:
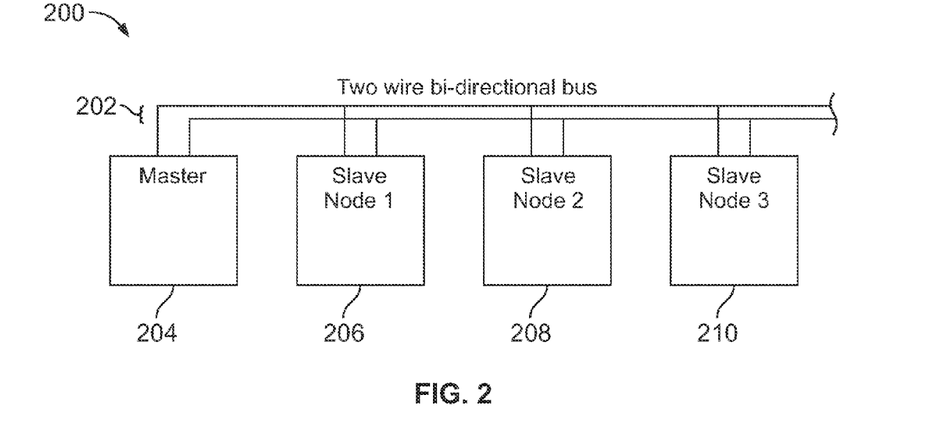
FIG. 2 is a schematic diagram of a bus master and bus slaves connected by a communication bus in accordance with some embodiments.

FIG. 2 shows a communication bus system 200 in accordance with some embodiments. Communication bus system 200 includes a two-wire bidirectional bus 202, a bus master 204, and bus slave nodes 206, 208, 210. The communication bus system 200 is suitable for the automotive battery application shown in FIG. 1, among other types of systems. The two-wire bidirectional bus 202 can be implemented as shown, with paired wires, shielded cable, shielded pairs, twisted pairs, or twisted pairs in shielded cable and other variations as readily devised. The two-wire bidirectional bus 202 supports differential voltages, as will be further described. A far end of the two-wire bidirectional bus 202 is shown as extendable. The total number of bus masters and bus slaves that can be coupled to the two-wire bidirectional bus 202 is dependent upon various factors such as capacitive loading, drive strength of the components, termination, length and impedance of the wiring, and signal timing. It should be appreciated that bus master 204 may be a controller, such as a microprocessor or programmable logic device, while slave nodes may be sensors in some embodiments.

Figure 3:
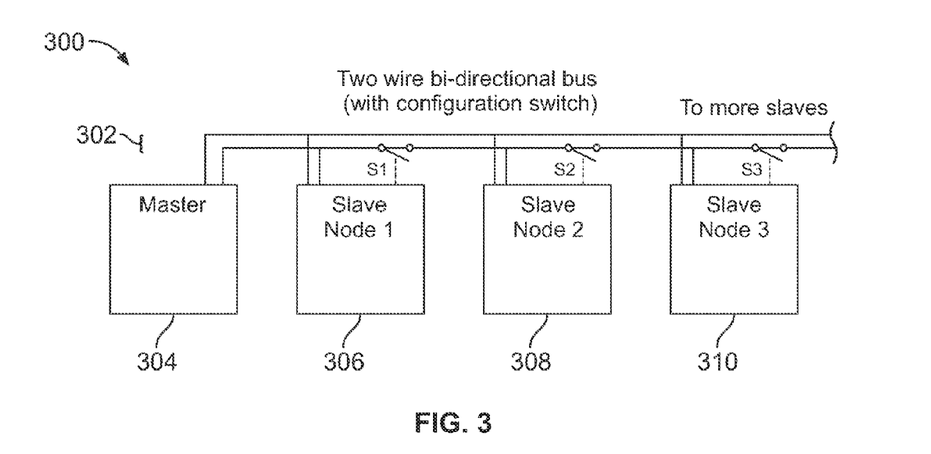
FIG. 3 is a schematic diagram of a bus master and bus slaves connected by a communication bus with switches in accordance with some embodiments.

FIG. 3 shows a communication bus system 200 having switches that provide galvanic isolation of slave nodes in accordance with some embodiments. A two-wire bidirectional bus 202 connects a bus master 204 and bus slave nodes 206, 208, 210. At each slave node, a switch S1, S2, S3 can activate to close or open to connect or disconnect the respective slave node along one of the wires of the two-wire bidirectional bus. Opening the switch S1 leaves a first bus slave node 206 coupled to the bus master 204 via the two-wire bidirectional bus 202, but disconnects downstream slave nodes, e.g., a second slave node 208 and a third slave node 210, etc., so that the downstream slave nodes 208 and 210, no longer communicate with the bus master 204. Similarly, opening the switch S2 leaves the second bus slave node 208 connected to the bus master 204 if the first switch S1 is closed, but disconnects downstream slaves, e.g., the third slave node 210, etc., so that the downstream slave nodes no longer communicate with the bus master 204. These actions and conditions can be repeated for further downstream slaves. The two-wire bidirectional bus 202 supports differential voltages. The switches S1, S2, S3 could be implemented using transistors of various types, or relays or other circuitry.

Figure 4:
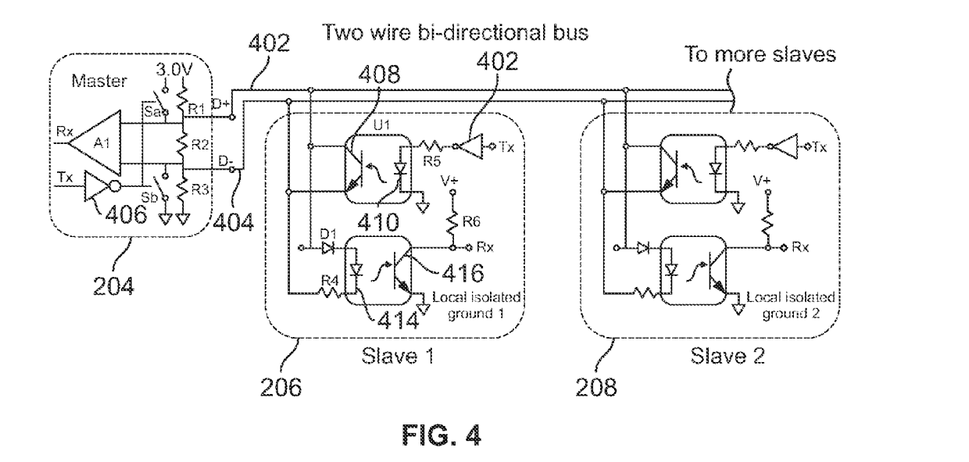
FIG. 4 is a schematic diagram of electronic circuitry in the bus master and bus slaves in accordance with some embodiments.

FIG. 4 shows an embodiment of electronic circuitry inside of the bus master 204 and the bus slave nodes 206, 208. A resistor ladder biases the two-wire bidirectional bus to a specified differential voltage, i.e., establishes the specified differential voltage on the bus, in the absence of driving by any transmitter onto the bus. In the embodiment shown, the resistor ladder establishes about 0.9 V on the bus at bus idle. The resistor ladder also provides a termination to the two-wire bidirectional bus, establishing a termination impedance of the bus. The resistor ladder has a first resistor R1 connected between a power supply voltage and the first wire 402 of the bidirectional bus, a second resistor R2 connected between the first wire 402 and the second wire 404 of the bidirectional bus, and a third resistor R3 connected between the second wire 404 and electrical ground, which may be a local ground terminal, for example, local to the bus master 204, or a system ground. In the embodiment shown, the resistor ladder is included in or otherwise associated with the bus master 204. However, the resistor ladder could be located elsewhere along the two-wire bidirectional bus in variations. Resistance for the resistors R1-R3 in the resistor ladder can be set at relatively low values for a low impedance bus, or higher for decreased drive strength requirements placed on the bus master 204 and the bus slave nodes 206 and 208. A low impedance bus, i.e., with low resistance values on the resistor ladder, generally supports higher frequency communication and greater noise immunity. One reason for the greater noise immunity is that a given current spike, from cross coupling, produces a lower voltage spike across a lower resistance value. A low impedance bus and small capacitive loading for each bus slave node added to the bus generally supports a higher number of bus slave nodes before signal rise and fall times degrade. In one example, the resistors in the resistor ladder each have about 300 to 360 ohms and the bus supports 100 kbps (kilobits per second) data rate serial communication.

Still referring to FIG. 4, a differential amplifier A1 is employed inside the bus master 204, to receive differential voltages from the two wires 402, 404 of the bidirectional bus. It should be appreciated that the term "wires" may be interchanged with the term "leads." The differential amplifier A1 is tuned to recognize a first specified differential voltage range as a logical zero, and a second specified differential voltage range as a logical one, and output these logical values on the Rx terminal of the differential amplifier A1. Various types of known differential amplifiers can be used with the embodiments described herein. An output terminal Rx of the differential amplifier A1 can be connected to the receiver input of a UART (universal asynchronous receiver transmitter), for the bus master 204. In the embodiment shown, the resistor ladder has resistor values selected to establish a specified differential voltage on the two-wire bidirectional bus that is received by the differential amplifier A1 as a logical one. In turn, the logical one is passed along to the receiver input of the UART, which interprets a logical one as an idle state or mark, in the absence of timed transitions to and from the logical zero state (which would indicate data transmission). The receive path of the bus master 204 thus receives differential voltages, as established by the resistor ladder, or transmitted by one of the bus slaves, and converts these differential voltages to logical zeros or ones via the differential amplifier A1, and expresses the logical zeros and logical ones on the Rx terminal.

Continuing with FIG. 4, inside the bus master 204, the transmit path takes logical zeros and logical ones from a Tx terminal, which may come from the transmitter output of the above-discussed UART and expresses them as differential voltages on the two wires 402, 404 of the bidirectional bus. The Tx terminal is configured to buffer the logical zeros and logical ones through a buffer 406, which can be an inverter as shown, and operating two switches Sa, Sb. The first switch Sa is connected between the power supply voltage and the first wire 402 of the bidirectional bus, and the second switch Sb is connected between the second wire 404 of the bidirectional bus and the ground terminal, which may be a local ground. In the version shown, a logical one arriving on the Tx input of the transmit path of the bus master 204 opens the switches Sa, Sb so that the bias value of the resistor ladder R1, R2, R3 is expressed as a differential voltage value on the two wires 402, 404 of the bidirectional bus. A logical zero arriving on the Tx input of the transmit path of the bus master 204 closes the switches Sa, Sb so that the full voltage spread from ground to the power supply voltage is expressed as a differential voltage value on the two wires 402, 404 of the bidirectional bus. The switches Sa, Sb can be implemented using transistors of various types, or relays or other circuitry. Control circuitry suitable for the polarity of the buffer 406 and the specifications of the switches Sa, Sb can be added in some embodiments. In variations, other values of differential voltage could be expressed for logical zeros or logical ones, other types of drivers could be used, or the switches could be replaced by three state buffers, and the circuitry can be devised or adjusted for these changes.

Continuing with FIG. 4, the transmit path of the bus slave 206 makes use of a switch 408 coupled across the two wires 402, 404 of the bidirectional bus. In this embodiment, when the switch 408 is open, the differential voltage on the bus remains at the bias value established by the resistor ladder. When the switch 408 is closed, the two wires 402, 404 of the bus are essentially shorted together by the switch 408 and the differential voltage value on the bus is close to 0 V (zero volts). In the version shown, the switch 408 is part of an optoisolator U1, and is implemented using a phototransistor. An optoisolator, also known as an optical isolator, generally includes an LED (light emitting diode) coupled optically to a phototransistor. A logical zero appearing on the Tx terminal of the bus slave 206 is inverted by an inverter 412, which provides a voltage across the resistor R5 and a current through the resistor R5 and through the LED 410. Photons from the LED 410 cause the phototransistor to turn on, which operate to close the switch 408. A logical zero in the transmit path of the bus slave 206 is thus expressed as an approximately 0 V differential voltage on the bidirectional bus. For example, one type of photo transistor has a nominal 5 mA sink capability when switched on, and the resistor ladder can have resistance values adjusted so that the phototransistor can sufficiently pull together the two wires 402 and 404 of the two wire bi-directional bus. A logical one in the transmit path of the bus slave node 206 is expressed as open or high impedance from the switch 408, so that the bias differential voltage value from the resistor ladder pre- dominates (unless another transmitter is sending). In variations, other values of differential voltage could be expressed for logical zeros or logical ones, and other types of drivers or switches could be used, such as those discussed with regard to the bus master.

Still referring to FIG. 4, the receive path of the bus slave 206 has a differential amplifier U2 connected across the first wire 402 and the second wire 404 of the bidirectional bus. In the version shown, the differential amplifier U2 is implemented using an optoisolator, which has an LED 414 and a phototransistor 416. The LED 414 may produce photons in the infrared range, in a visual range, or an ultraviolet range, etc., and the phototransistor should be selected or matched to respond to the photons in the respective range. The optoisolator acts as a differential amplifier in the sense that the output of the optoisolator responds to various differential voltages as seen on the bidirectional bus. A diode D1 is connected between the first wire 402 of the bidirectional bus and the anode (positive) terminal of the LED 414, which effectively raises the turn on threshold of the circuit to two diode drops. A resistor R4 connected between the cathode (negative) terminal of the LED 414 and the second wire 404 of the bidirectional bus acts as a current-limiting resistor for the two diodes D1, 414 in series. A differential voltage of less than two diode drops on the bidirectional bus results in the LED 414 being off, no photons being generated by the LED 414, and the phototransistor 416 being in an off state. A resistor R6 connected to a local power supply voltage and in series with the phototransistor 416 has a receiver output terminal Rx at the junction between the resistor R6 and the phototransistor 416. When the phototransistor 416 is off, the receiver terminal Rx of the bus slave 206 shows a logical one, i.e., is close to the local power supply voltage. A differential voltage of greater than two diode drops on the bidirectional bus results in the LED 414 turning on, and photons being generated by the LED 414, which turns the phototransistor 416 to an on state. With sufficient current passing through the phototransistor 416, and depending on the value selected for the resistor R6, the receiver terminal Rx of the bus slave 206 shows a logical zero. Other types of differential amplifiers or other types of input circuits can be used in variations of the bus slave 206, as can different tunings for various differential voltages and logical values. For example, a differential amplifier with hysteresis could be used, as could MOSFETs, bipolar transistors, relays, common power supply and ground connections, other types or levels of biasing or polarity and so on. The use of optoisolators U1, U2 allows the bus slave 206 to have local ground and local power supply independent of the ground and power supply in the bus master 204. This is useful when the slave node 206 is applied to monitoring circuitry for battery cells that are connected in series, where DC (direct current) voltages can develop that may be slightly or greatly in excess of the power supply voltages of the master 204 or of other slave nodes. The second slave node 208 and other slave nodes can use identical circuitry, or can use variations in circuitry. Other types of isolation devices such as transformers or level shifting circuitry can be used in variations of the slave node 206.

Figure 5:
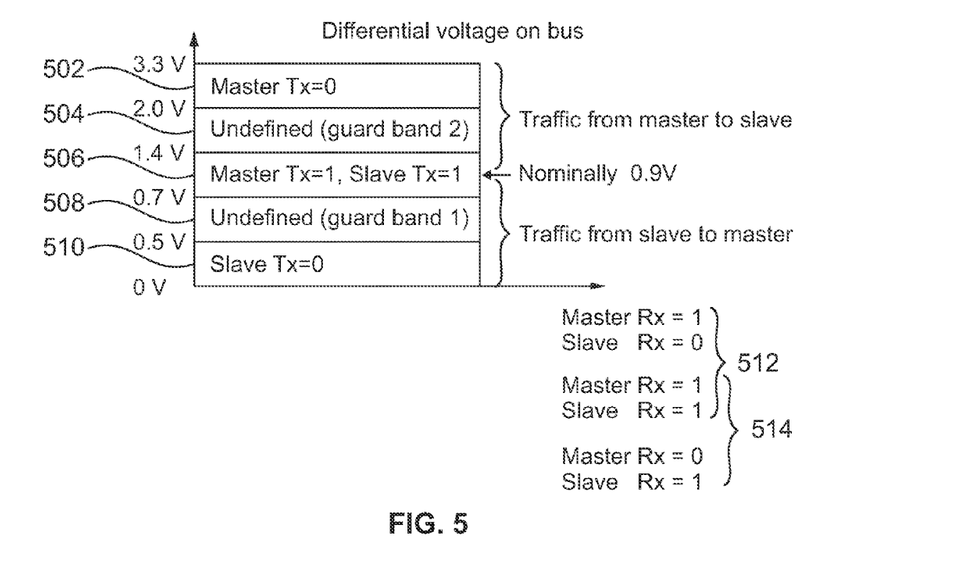
FIG. 5 is a voltage diagram of differential voltage levels, as applicable to the communication bus in accordance with some embodiments.

FIG. 5 is a diagram showing differential voltage levels as seen on the two-wire bidirectional bus of FIGS. 1-4. As generally understood, a differential voltage is said to be zero when the voltage on the first wire 402 (which may also be called D+ or V+) is approximately equal to the voltage on the second wire 404 (which may also be called D− or V−). The differential voltage is said to be greater than zero when the voltage on the first wire 402 is greater than the voltage on the second wire 404. Absolute voltage on the first wire 402 or the second wire 404 can be compared to a reference voltage, such as a ground voltage which may be local or global. The differential voltage values shown are selected for a specified embodiment, and can be adjusted, or used as relative or absolute voltage values, for further embodiments.

Voltages in a first voltage range 512 are transmitted from a bus master to one or more bus slaves. The first voltage range 512 includes a first voltage sub range 502 and a second voltage sub range 506. Voltages in a second voltage range 514 are transmitted from a bus slave to the bus master. The second voltage range 514 includes the second voltage sub range 506 and a third voltage sub range 510. That is, the first voltage range 512 and the second voltage range 514 overlap. The overlap of the first voltage range 512 and the second voltage range 514 includes the second voltage sub range 506. Both the first voltage sub range 502 and the third voltage sub range 510 are arranged outside of this overlap.

The first voltage sub range 502 is for a differential voltage value of between 3.3 V and 2.0 V, inclusive. The first voltage sub range 502 is expressed as a differential voltage on the bidirectional bus when the bus master is transmitting a logical zero. The first voltage sub range 502 is received by a bus master receiver as a logical one, and received by a bus slave receiver as a logical zero. The second voltage sub range 506 is for a differential voltage value of between 1.4 V and 0.7 V, inclusive. The second voltage sub range 506 is expressed as a differential voltage on the bus when the master is transmitting a logical one, a slave is transmitting a logical one, or neither a master nor a slave is transmitting, i.e., the bus is idle. The second voltage sub range 506 is received by a bus master receiver as a logical one, and received by a bus slave receiver as a logical one. The third voltage sub range 510 is for a differential voltage value of between 0.5 V and 0 V, inclusive. The third voltage sub range 510 is expressed as a differential voltage on the bus when a slave is transmitting a logical zero. The third voltage sub range 510 is received by a bus master receiver as a logical zero, and received by a bus slave receiver as a logical one. In further embodiments, the voltage levels shown in FIG. 5 could be absolute voltages, or relative voltages, applied to a two-wire bidirectional bus with one of the wires being ground or other reference voltage and the other of the wires being a signaling wire. Voltage polarities could be reversed for one of the voltage ranges, or equivalently the differential voltage could be a negative voltage for one of the voltage ranges.

Although other differential voltage value assignments and logical value assignments can be made and operated successfully on the two-wire bidirectional bus, the differential voltage values and logic value assignments shown herein have powerful properties in the communication of the bus system described herein. For example, serial communication can readily be used in the bus system, with the bus master having a UART and each of the slave nodes having a respective UART. When none of the UARTs is transmitting data, all of the UARTs are sending out an idle or mark state, which is a logical one. This is expressed as a voltage in the second voltage sub range 506, which is received by the master receiver as a logical one and received by the slave receiver as a logical one. All of the UARTs will be looking for a logical zero start bit, during this idle state. When the bus master starts transmitting, the bus master sends the start bit as a logical zero expressed as a voltage in the first voltage sub range 502 on the bus, which is received by the bus master receiver as a logical one and is received by the receivers of the respective slave nodes as a logical zero. The bus master receiver is thus not disturbed by bus master transmission as the bus master does not see its own transmissions and the bus master does not monitor the bus for bus slave traffic while the bus master is transmitting in some embodiments. It should be appreciated that the transmission from the bus master overpowers any transmission from a bus slave in some embodiments. All of the bus slave nodes (unless disconnected from the bus) receive or see the first voltage sub range 502 as a logical zero or start bit, and begin receiving serial data from the bus master. The bus master is enabled transmit to all of the slaves, but not bother receiving the bus master's own transmission. Logical zeros and logical ones sent by the bus master are experienced by the bus master receiver as all being logical ones, keeping the bus master receiver in the idle state.

In the reverse direction, when a bus slave node starts transmitting, the bus slave node sends the start bit as a logical zero expressed as a voltage in the third voltage sub range 510 on the bus, which is received by the receivers of respective bus slave nodes as a logical one and is received by the bus master receiver as a logical zero. The receivers of the bus slave nodes are thus not disturbed by a bus slave node transmission, and can continue to look for data being sent by the bus master. The bus master (unless disconnected from a bus slave that is transmitting) receives or sees the third voltage sub range 510 as a logical zero or start bit, and begins receiving serial data from the bus slave node. The bus slave node can thus transmit to the bus master, but not bother receiving the bus slave's own transmission. Other bus slave nodes also do not bother receiving the transmission from the bus slave node. Logical zeros and logical ones sent by the bus slave node are experienced by the bus slave receivers as all being logical ones, keeping the bus slave receivers in the idle state. With this arrangement of bus values, the bus master can broadcast to all of the bus slave nodes, i.e., operate in broadcast mode, and a single slave node can communicate back to the bus master in response. Communication processing is minimized, as the bus master receiver does not have to look at transmissions by the bus master transmitter and the bus slave receivers do not have to look at transmissions by other bus slaves. It should be appreciated that this reduces processing overhead overall.

Selection of the first, second and third voltage sub ranges 502, 506, 510 can confer a directionality to the communications, as discussed above. When the first voltage sub range 502 is observed on the two-wire bidirectional bus, communication is from the bus master to the bus slave nodes. When the third voltage sub range 510 is observed on the two-wire bidirectional bus, communication is from a bus slave node to the bus master. In one embodiment, various component values are adjusted (i.e., components selected) so that the master can "win" the bus if a rogue slave node is communicating when it shouldn't be. For example, with reference to FIG. 4, the closed-switch impedances of the switches Sa, Sb of the bus master 204 can be selected at a value lower than the closed-switch impedance of the switch 408 of the bus slave 206, so that the bus master 204 can express a differential voltage within the first voltage sub range 502 on the bus even if a bus slave 206 is attempting to express a differential voltage within the third voltage sub range 510 on the bus.

The communication bus system described herein achieves a low-cost, bidirectional, half duplex operation over a two wire interface, with advantages provided by the various embodiments. The bus master, and each of the bus slaves nodes, acts as a transceiver for a commonly available UART as found with many microcontrollers. Optoisolators in the bus slave provide galvanic isolation. For example, each bus slave can be operated with a different local power supply such as by connecting to local battery cells, even when the battery cells are stacked in series. Further, if one of the bus slaves experiences a local power supply failure, such as a battery cell going dead, this does not disrupt communication between the bus master and the remaining bus slaves. Differential signaling provides high immunity to common mode noise. In addition, guard band 1 508 and guard band 2 504 are provided to offer a buffer for any noise in the system. It should be appreciated that the ranges for the guard bands 504 and 508, as well as the other voltage ranges of FIG. 5, are illustrative and not meant to be limiting as any suitable ranges may be selected to achieve the functionality described herein. The optoisolators also provide high immunity to common mode noise. Signaling voltages that are kept positive, i.e., no negative differential voltages, do not reverse bias the emitter-base junction of the phototransistor in the optoisolator U1 of the bus slave node. This avoids hot carrier injection, which is known to degrade the gain of a phototransistor. The circuits shown herein operate as a transceiver for commonly available UARTs. The circuits are relatively insensitive to bus loading, allowing stable performance as additional bus slaves are added to the bus.

Figure 6:
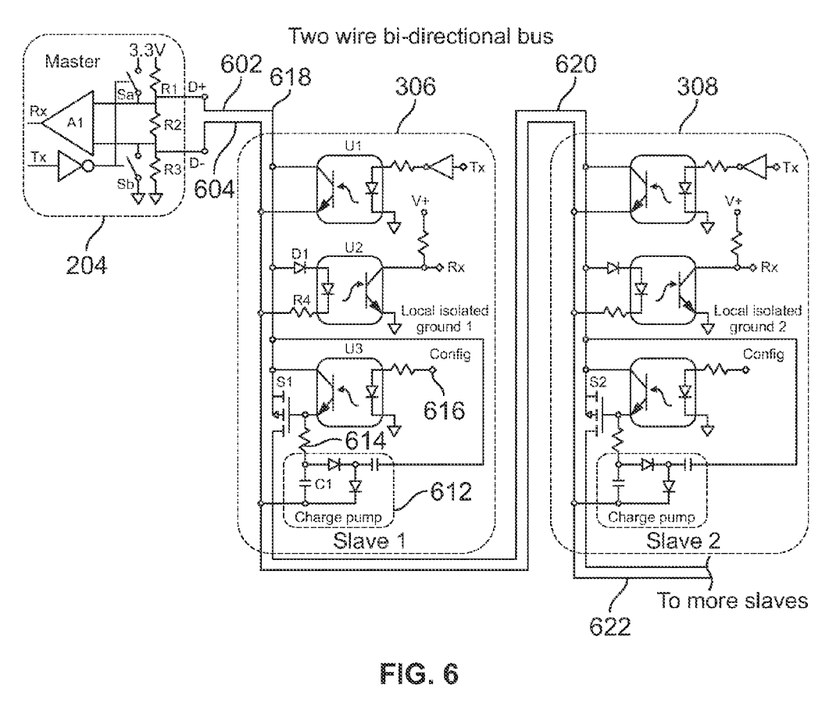
FIG. 6 is a schematic diagram of electronic circuitry in the bus master and bus slaves in accordance with some embodiments.

FIG. 6 shows the electronic circuitry inside of a bus master 204 from FIG. 2 and bus slaves 306, 308 from FIG. 3, in an embodiment of the communication bus system. A switch S1 is added to the bus slave 306. Each slave has a similar switch in some embodiments. The switch allows a slave to controllably couple and decouple a downstream segment 620 of the two-wire bidirectional bus and an upstream segment 618 of the two-wire bidirectional bus. In this version, the switch S1 is implemented by a PMOSFET that couples the upstream segment 618 of wire 602 of the two-wire bidirectional bus to the downstream segment 620 of the wire 602. Specifically, the source terminal of the switch S1 is connected to the upstream portion and the drain terminal of the switch S1 is connected to the downstream portion of the wire 602. Here, upstream and downstream are relative to the bus slave 306, and are relative to the switch S1 in the particular bus slave 306. A second bus slave 308 has a similar switch S2, which can couple an upstream segment 620 and a downstream segment 622 of the two-wire bidirectional bus. It should be appreciated that segment 620 of the bidirectional bus is downstream for an upstream bus slave 306 and is upstream for a downstream bus slave 308. A similar statement can be made about other segments of the bidirectional bus relative to other bus slaves. Generally, upstream means closer to the bus master 204, and downstream means further away from the bus master 204. Segment 622 of the bus, as shown in FIG. 6, can be connected to additional bus slaves, whereupon this segment 622 of the bus would be an upstream segment to those bus slaves.

A switch control is included in the bus slave 306. In this embodiment, the switch control includes an optoisolator U3 and a resistor 614. Power for the switch control is provided by a charge pump 612, which is coupled to the two-wire bidirectional bus. Other types of switches, such as bipolar transistors of various types, MOSFETs of various types, relays and so on can be used in variations. Other types of switch controls are readily devised. The charge pump includes a capacitor C1 coupled to one wire 604 of the two-wire bidirectional bus. The capacitor is coupled to two diodes in series, the second of which connects to the wire 604 of the two-wire bidirectional bus. At the junction of the capacitor C1 and the first diode, the charge pump connects to one end of the resistor 614 that connects to the gate terminal of the switch S1. At the junction between the two diodes of the charge pump, a capacitor has one terminal connected. The other terminal of the capacitor connects to the wire 602 of the two-wire bidirectional bus. As the two wires 602, 604 of the two-wire bidirectional bus show activity, with differential voltages of various magnitudes being expressed by serial data from either the transmitter of the bus master 204 or one of the transmitters of the bus slaves 306, 308, the charge pump operates to pump down the end of the resistor 614 and the gate terminal of the switch S1 to a negative voltage, relative to the source terminal of the switch S1. In this manner, the charge pump provides electrical power to the switch control. This action turns on the switch S1, in the embodiment where switch S1 is a PMOSFET, so long as a switch in the optoisolator U3, i.e., a further switch in the switch control, is not electrically shorting the gate terminal and source terminal of the switch S1 to each other. With the switch S1 closed, the upstream and downstream segments of the bidirectional bus are coupled together by the switch S1. When the switch control shorts together the gate and source terminals of the switch S1, the gate to source voltage becomes approximately 0 V and the switch S1 is turned off, which opens the switch S1 and decouples the upstream and downstream segments of the bidirectional bus. It should be appreciated that the operation of switch S1 is described for the implementation of switch S1 as a PMOSFET for illustrative purposes and not meant to be limiting.

The switch control responds to a blocking signal 616, which may also be called a configuration signal. When the blocking signal 616 is active, the LED in the optoisolator U3 is turned on. Photons from the LED in the optoisolator U3 then turn on the phototransistor in the optoisolator U3, which electrically shorts the gate and source terminals in the switch S1, thereby turning switch S1 off when implemented as a PMOSFET. This action by the turned on phototransistor disables and discharges the charge pump. Conversely, when the blocking signal 616 is inactive, i.e. off, low or a logical zero, the LED and phototransistor in the optoisolator U3 are off, and the gate and source terminals of the switch S1 are not electrically shorted together. This allows charge to build on the gate terminal of the switch S1, as provided by the charge pump 612. In this version, the charge is negative, which expresses a negative voltage on the gate terminal of the switch S1, thereby turning on switch S1 when implemented as a PMOSFET.

Other types of charge pumps and couplings of charge pumps to the switch control can be used in variations. For example, voltage doublers, voltage triplers, positive voltage pumps, negative voltage pumps and so on can be devised and employed as needed for various types of switches. These may be useful to overcome leakage at higher operating temperatures. An active charge pump could open the switch, or close the switch. A charge pump disabled by the switch control could close the switch, or open the switch. Software could send a series of ones and zeros from the bus master out on the bus in order to drive the charge pumps of the bus slaves into developing their respective negative voltages, prior to activating the blocking signal 616. One way to do this would be to send "55" or "AA" (hexadecimal) characters from a UART coupled to the bus master.

Figure 7:
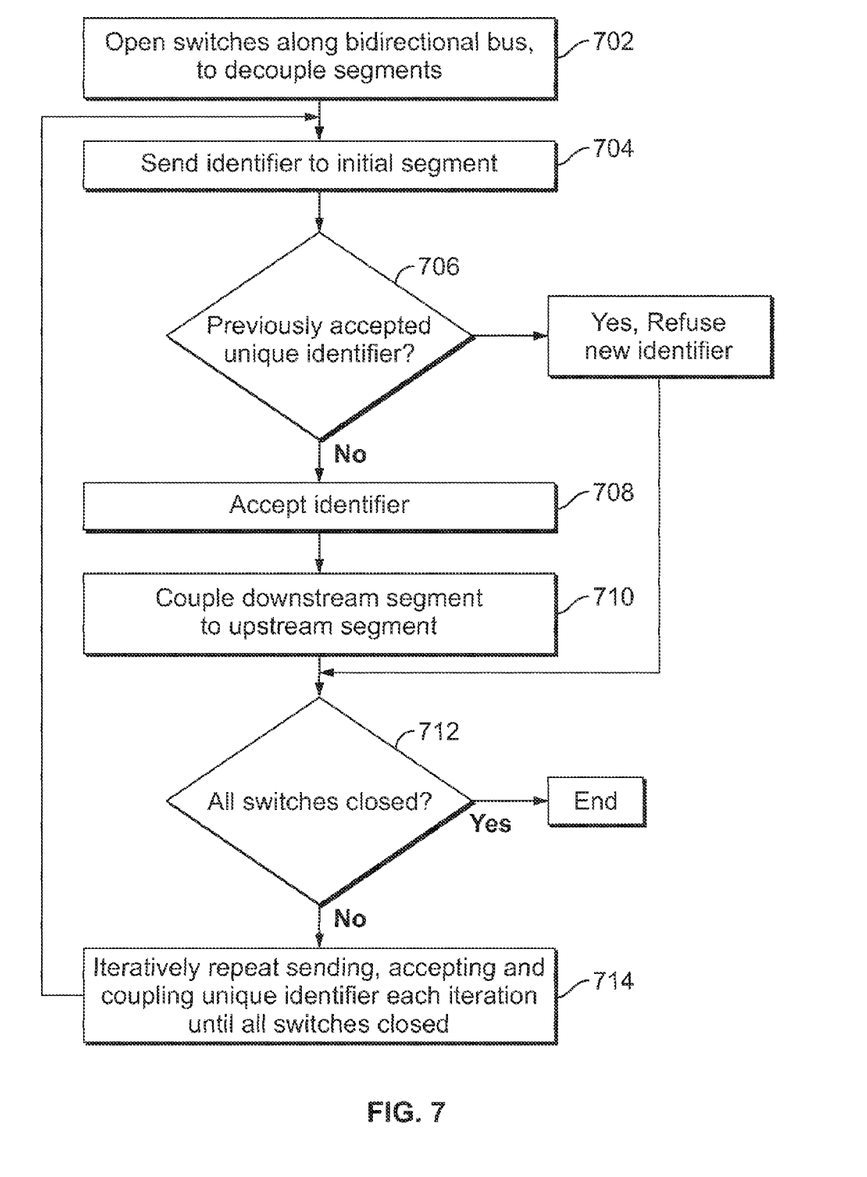
FIG. 7 is a flow diagram of a method of operating a communication bus having switches in accordance with some embodiments.

FIG. 7 shows a method of operating a bidirectional bus, which may be practiced using the bus master and bus slaves of FIGS. 3 and 6. In one action 702, switches successively positioned along a bidirectional bus are opened, to decouple segments of the bidirectional bus from each other. For example, with reference to FIG. 6, the blocking signal 616 could be asserted, which opens the switch S1 in the bus slave 306 and opens the switch S2 in the bus slave 308, decoupling the segments 618, 620, 622 of the two-wire bidirectional bus. In some embodiments, this action could be preceded by powering up the system with all of the switches closed for any initial communication, such as sending a message to have each slave assert a respective version of the blocking signal 616, or a global transmission of the blocking signal.

Returning to FIG. 7, the method advances to operation 704, an identifier is sent to an initial segment of the bidirectional bus. For example, the bus master may send a message out onto a first segment of the two-wire bidirectional bus to which the bus master is directly coupled. The message is intended for the bus slaves, specifically for a bus slave on a segment of the two-wire bidirectional bus, which segment is in communication with the bus master. For example, the first time such a message with an identifier is sent out, the intended recipient of the message and the identifier would be the first bus slave 206 (see FIG. 3). The method proceeds to decision operation 706, where it is determined if a unique identifier has been previously accepted. If the answer is yes, a unique identifier has been previously accepted, e.g. by a bus slave, then the new identifier is refused by the bus slave that has previously accepted the unique identifier, and the method flow resumes with an action 712. If the answer is no, a unique identifier has not been previously accepted, the method flow resumes with an action 708, in which the identifier is accepted. For example, consider two bus slaves that are in communication with a bus master. The upstream bus slave has previously accepted an identifier and closed the switch connecting the segment of the bus to which the downstream bus slave is coupled. In the embodiments, the upstream bus slave refuses the newest identifier, as a result of or in response to having previously accepted an identifier. The downstream bus slave accepts the newest identifier, as a result of or in response to not having previously accepted an identifier. After accepting the identifier in the action 708, the bus slave that has just recently accepted the identifier then couples the downstream segment of the bus to the upstream segment of the bus, in an action 710.

The method advances to operation 712, where it is determined if all the switches are closed. If the answer is yes, all the switches are closed, the method flow terminates. If the answer is no, all the switches are not yet closed, flow continues with an action 714 which branches back to join the action 704. The sending, accepting and coupling are iteratively repeated with a unique identifier for each iteration, until all switches are closed. The above-described method of operating a bidirectional bus serves to assign unique identifiers to respective segments of the bidirectional bus. In one embodiment, each identifier is associated with and assigned to a bus slave coupled to a respective segment of the bidirectional bus. When a bus slave accepts the identifier, that bus slave then couples the next segment of the bidirectional bus to the present segment of the bidirectional bus, i.e. to the respective segment of the bidirectional bus to which the bus slave is presently coupled. In this manner, through iterative identifier assignments and bus segment couplings, the bus slaves are successively switched in one by one, each receiving a unique identifier and switching in the next bus slave, until all bus slaves have identifiers and are in communication with the bus master.

The method of FIG. 7 and the bidirectional bus system shown in FIGS. 3 and 6 provide a mechanism that allows a master, communicating over a broadcast bus, to direct broadcast traffic to a single slave, and assign an identifier to that slave. This obviates the need to preprogram slaves with preassigned identifiers during manufacture, to maintain inventories of preprogrammed slaves with preassigned identifiers, or to design in and mechanically set switches on circuit boards in order to assign identifiers to bus slaves. The bus switches can open to block communication to downstream bus slaves, while allowing a most recently switched in bus slave to receive the next identifier and connect the next bus slave in an iterative process.

In one embodiment, a first bus slave is coupled to a bus master, without any switches intervening between the master and the first bus slave. In this manner, when the switches are open, the first bus slave can receive the first identifier and then close a first switch and couple in a second bus slave. When the bus master broadcasts the second identifier, the first bus slave refuses or ignores a new identifier but the second bus slave receives the second identifier and then closes a second switch to couple in a third bus slave, and so on. In some embodiments, diagnostics software may be added. For example, the bus master or a controller could maintain a software map of identifiers and a physical order and or location of the bus slaves in non-volatile memory. Diagnostics software could then determine whether identifiers are missing or changed in the slaves.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A bidirectional bus system, comprising:
  a plurality of bus slaves configured to couple to a bidirectional bus, each bus slave of the plurality of bus slaves having a switch operated by a switch control to selectably couple and decouple an upstream portion and a downstream portion of the bidirectional bus relative to the bus slave, with the switch control coupled to a charge pump that couples to the bidirectional bus so that the switch control is powered by a differential voltage generated by serial data activity from a transmitter of a bus master coupled to the bidirectional bus through the charge pump, or a transmitter of at least one of the plurality of bus slaves through the charge pump;
  wherein the switch control includes an optoisolator coupled to a resistor, the resistor coupled to the charge pump.

2. The bidirectional bus system of claim 1, further comprising:

the charge pump of each bus slave configured to derive electrical power from the serial data activity on the bidirectional bus.

3. The bidirectional bus system of claim 2, wherein the charge pump is configured to provide the electrical power to the switch control.

4. The bidirectional bus system of claim 1, wherein the switch control is configured to close the switch and couple the upstream portion and the downstream portion of the bidirectional bus in response to receiving electrical power from the charge pump and an absence of an assertion of a blocking signal, and wherein the switch control is configured to open the switch and decouple the upstream portion and the downstream portion of the bidirectional bus in response to receiving the assertion of the blocking signal.

5. The bidirectional bus system of claim 1, wherein the switch is configured to couple to a first wire of the bidirectional bus.

6. The bidirectional bus system of claim 1, further comprising:
   each bus slave of the plurality of bus slaves having a transmitter configured to couple to the bidirectional bus; and
   each bus slave of the plurality of bus slaves having a receiver configured to couple to the bidirectional bus, wherein the transmitter and the receiver are operable with power and ground that are local to the bus slave.

7. The bidirectional bus system of claim 1, wherein the switch includes a transistor configured to couple to one wire of the bidirectional bus.

8. A bidirectional bus system, comprising:
   a plurality of bus slaves configured to couple to a bidirectional bus, each bus slave of the plurality of bus slaves having:
      a switch configured to couple and decouple an upstream portion of a first wire and a downstream portion of the first wire of a bidirectional bus;
      a switch control coupled to the switch; and
      a charge pump configured to connect in a direct manner to the bidirectional bus and to provide electrical power, derived from direct connection to, and serial data activity on, the bidirectional bus, to the switch control, wherein the switch control includes an optoisolator coupled to a resistor, the resistor coupled to the charge pump.

9. The bidirectional bus system of claim 8, wherein:
   the charge pump is coupled to the switch control; and
   the charge pump is configured to provide the electrical power to the switch control in response to the serial data activity on the bidirectional bus.

10. The bidirectional bus system of claim 8, wherein:
    the switch comprises a PMOSFET (P channel metal oxide semiconductor field effect transistor) having a source terminal, a drain terminal and a gate terminal, the PMOSFET being configured to couple the source terminal to the upstream portion and the drain terminal to the downstream portion of the first wire of the bidirectional bus;
    the switch control comprises a further switch coupled to the gate terminal of the PMOSFET and to the source terminal of the PMOSFET, the further switch able to short the gate terminal to the source terminal of the PMOSFET; and
    the switch control comprises a resistor coupled to the gate terminal of the PMOSFET and to the charge pump, wherein the charge pump is operable to express a negative voltage on the gate terminal relative to the source terminal of the PMOSFET in an absence of the further switch electrically shorting the gate terminal to the source terminal of the PMOSFET.

11. The bidirectional bus system of claim 8, wherein:
    the switch comprises a PMOSFET; and
    the switch control comprises an optoisolator having a phototransistor coupled across source and gate terminals of the PMOSFET.

12. The bidirectional bus system of claim 8, wherein the switch control is configured to disable the charge pump in response to an assertion of a blocking signal.

13. The bidirectional bus system of claim 8, further comprising:
    a bus master configured to couple to the bidirectional bus upstream of a first one of the plurality bus slaves, the bus master having a transmitter and a receiver.

14. The bidirectional bus system of claim 8, wherein each bus slave of the plurality of bus slaves comprises:
    a transmitter having a first optoisolator; and
    a receiver having a second optoisolator.

15. A method of operating a bidirectional bus, comprising:
    opening a plurality of switches successively positioned along a bidirectional bus, to decouple segments of the bidirectional bus from each other using a switch control including an optoisolator coupled to a resistor;
    sending an identifier to an initial segment of the bidirectional bus;
    accepting the identifier at an upstream segment of the bidirectional bus, the upstream segment being in communication with the initial segment of the bidirectional bus;
    coupling a downstream segment of the bidirectional bus to the upstream segment of the bidirectional bus with one of the plurality of switches in response to accepting the identifier, wherein the one of the plurality of switches is supplied electrical power by a charge pump having a direct connection to the bidirectional bus, the electrical power derived by the charge pump from serial data activity on the bidirectional bus; and
    iteratively repeating the sending, the accepting and the coupling, with an unique identifier for each iteration, until each switch of the plurality of switches is closed.

16. The method of claim 15, further comprising:
    deriving, via the charge pump, electrical power for a switch control coupled to the one of the plurality of switches, from the serial data activity on the bidirectional bus.

17. The method of claim 15, further comprising:
    refusing to accept the identifier at a presently closed switch during a present iteration in response to accepting the unique identifier during a previous iteration.

18. The method of claim 15, wherein opening the plurality of switches comprises:
    discharging the charge pump coupled to the one of the plurality of switches.

19. The method of claim 15, wherein coupling the downstream segment of the bidirectional bus to the upstream segment of the bidirectional bus with one of the plurality of switches comprises:
    providing electrical power from the charge pump to a control terminal of the one of the plurality of switches, wherein the charge pump is connected in a direct manner to the control terminal of the one of the plurality of switches.

* * * * *